US006601279B2

(12) United States Patent
Scott

(10) Patent No.: US 6,601,279 B2
(45) Date of Patent: Aug. 5, 2003

(54) PISTON PULLING APPARATUS

(76) Inventor: Robert T. Scott, 16840 SW. 62nd St., Southwest Ranches, FL (US) 33331

( * ) Notice: Subject to any disclaimer, the term of this patent is extended or adjusted under 35 U.S.C. 154(b) by 0 days.

(21) Appl. No.: 10/051,246

(22) Filed: Jan. 18, 2002

(65) Prior Publication Data

US 2002/0095759 A1 Jul. 25, 2002

Related U.S. Application Data

(60) Provisional application No. 60/262,671, filed on Jan. 22, 2001.

(51) Int. Cl.[7] .................................................. B23P 19/04

(52) U.S. Cl. .............................. 29/259; 29/263; 72/393

(58) Field of Search .......................... 29/256, 258, 259, 29/260, 261, 262, 263, 265, 266, 280, 282, 926.5; 72/393

(56) References Cited

U.S. PATENT DOCUMENTS 3,986,383 A * 10/1976 Petteys ........................ 72/393
4,019,235 A 4/1977 Gregg
4,589,180 A * 5/1986 Vachon ........................ 29/263
4,852,235 A * 8/1989 Trease ......................... 29/263
RE36,009 E * 12/1998 Shultz ..................... 29/898.08

OTHER PUBLICATIONS

MTU Deutsche Aeorspace—Tool List M004021/20DE—Diesel Engine 6V–16V396..04—Edition 9/92.

* cited by examiner

*Primary Examiner*—Timothy V. Eley
*Assistant Examiner*—Daniel Shanley
(74) *Attorney, Agent, or Firm*—Robert M. Schwartz; Gerald R. Hibnick

(57) ABSTRACT

A piston pulling apparatus constructed like a mandrel; having top and bottom ends and a cylindric periphery body defined by an array of piston bowl gripping segments having tops and bottoms and lying longitudinally between the top and bottom ends. The top end and the proximate tops of segments are held to each other with a fixed radius and circumference. The bottom end and its proximate array of bottoms are coupled to enable the radial expansion of the array from its bottoms. A threaded shaft lies axially within the body and is coupled to the bottom end to move it vertically upward axially, to displace the segment array bottoms radially, to increase the effective circumference of this apparatus near its bottom end; which, during the expansion, can be positioned to grip the inner sides of a piston bowl.

12 Claims, 3 Drawing Sheets

FIG. 6
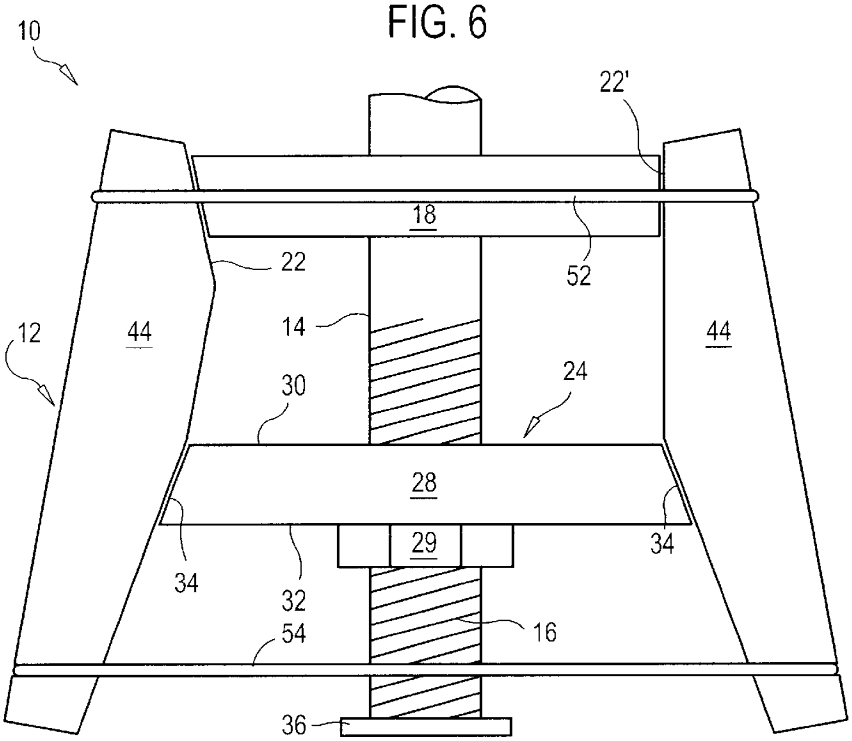
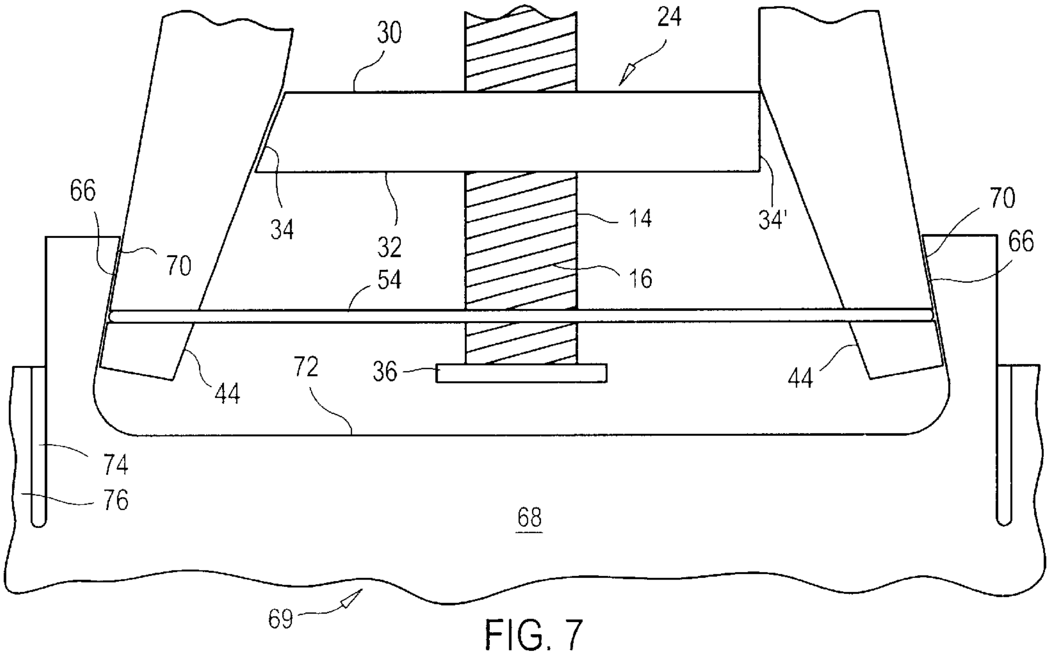
FIG. 7

PISTON PULLING APPARATUS

CROSS-REFERENCE TO RELATED APPLICATION

This application claims the benefit of U.S. Provisional Application Ser. No. 60/262,671, filed Jan. 22, 2001.

BACKGROUND OF THE INVENTION

1. Field of the Invention

This invention concerns apparatus for aiding the maintenance and repair of engines, such as diesel engines; the subject apparatus being employed for pulling the piston out from its associated cylinder.

2. Background and Prior Art

The repair and/or maintenance of reciprocating engines, having pistons or piston rods moving back and forth linearly within cylinders, often requires the removal of a piston from within its respective cylinder. The removal of a piston usually presents minimal effort/problem with respect to small engines, having small diameter cylinders and associated pistons, as with passenger automobiles. However, larger reciprocating engines, especially diesel engines, can present a difficult task in the removal of a piston, without damage to the piston, its cylinder and adjacent components. A common method for removing pistons has been to drive them out manually, as with a mallet, from one end of the cylinder, out through the opposite end. Such manual/mallet method often is physically difficult, too time consuming, and can damage the piston, cylinder, cylinder liner, bearings, crank shaft, connecting rod, piston cooler nozzle, etc. Some very large diesel engines, such as for railroad and ocean liners, construct the top of the piston to receive a large eye bolt or chain, which is attached to the piston at the time for its removal. At such removal time, a pulling mechanism, such as a block and tackle, is connected to the eyebolt; and the piston is pulled from the cylinder. One problem with this pulling approach is the need for supporting the upper end of the block and tackle. Another problem is that the top surface of the piston has to be threaded to receive the eyebolt. It is neither practical nor time effective to thread the top surface at time of pulling. Also, the piston body could be weakened if the piston diameter and length are relatively small, as with diesel engines, for various classes and types of marine, automotive, truck and stationary engine applications.

As well known, a piston slides tightly within the cylinder liner, its cylinder or engine block. Usually, the top of a piston of a diesel engine is formed with a combustion or compression bowl, having a generally vertical interior side. Often, the bowl has a base diameter smaller or larger than the diameter at its upper top lip; thus, not providing any good clamping surfaces for a tool pulling the piston from the cylinder liner, engine block and/or cylinder.

The prior art does teach a piston puller to L. Gregg U.S. Pat. No. 4,019,235 useable after the cylinder liner is removed. Thereupon, a sleeve of the tool is inserted in the annular space vacated by the liner and has a bottom end which surrounds the exterior bottom of the piston. The tool then is pulled upward to remove its sleeve and the piston it is grasping. Another piston puller uses a turnbuckle for pulling a piston from a cylinder. The turnbuckle is placed into the combustion bowl, with the turnbuckle's two ends pointed towards opposite interior sides of the bowl. Then, a short rod is placed manually into the center of the turnbuckle, or a small wrench clamps over it, and is pivoted through a plurality of small accurate motions, with the rod or wrench moved away from the longitudinal axis of the piston, to tighten the turnbuckle ends into the combustion bowl. The turnbuckle continues to lie at right angle to the longitudinal axis of the piston. Next, the turnbuckle is pulled vertically along the longitudinal axis of the piston, to pull the piston from the cylinder liner. This turnbuckle apparatus and method is slow, inconvenient, if not impossible, to use. For example, some compression bowls, such as for the Caterpillar and Cummins 5½" and 5⅜ bores, have an upward projection—cone shaped—in the center of the bowl. Hence, a turnbuckle-like device could not lie across the interior diameter of the bowl. At best, it is difficult to provide sufficient grip upon the interior side of the combustion bowl; whereupon, the apparatus can slip out of the bowl, damaging the bowl, the cylinder liner, etc. and the hand of the user.

SUMMARY OF THE INVENTION

The present invention is an apparatus easy to use manually, applies a significantly sufficient force quickly upon the entire interior side surface of the combustion bowl, and is safe to use. This apparatus has a radially expanding mandrel comprised of a plurality of gripping segments. The radially exterior surfaces of these segments are arcuate and are wedged or cammed outwardly against the entire interior surface of the circular sidewall of the combustion bowl by the axial lifting of a wedge shaped base member against the interior surface of the mating mandrel segments. The lifting of the wedge shaped base member is achieved by the manual rotation of a threaded shaft, which is coaxial with the expanding mandrel and the piston. The mechanical force ratio of the invention is significant, such that turning of the threaded shaft, as by a handle, is done easily and quickly, with high mechanical leverage/force and a resulting very positive fit of the mandrel segments against the inside of the combustion bowl.

BRIEF DESCRIPTION OF THE FIGURES

FIG. 6 is a partial side view of the embodiment shown in FIG. 1, with the expansion base member elevated, so as to wedge the lower portion of the gripping segments outward radially;

FIG. 7 is a fragmentary side elevational view, showing the lower portion of the gripping segments oriented as in FIG. 6, seated into a combustion bowl, with the piston partly pulled from the cylinder liner;

DESCRIPTION OF PREFERRED EMBODIMENTS

Figure 1:
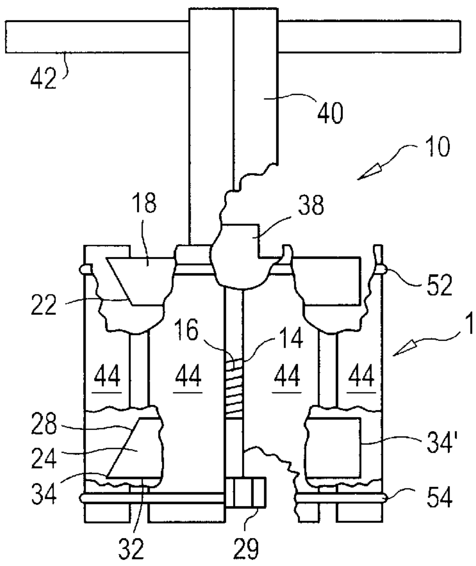
FIG. 1 is a side elevational view, partly in section, of one of the embodiments of the invention.
Figure 2:
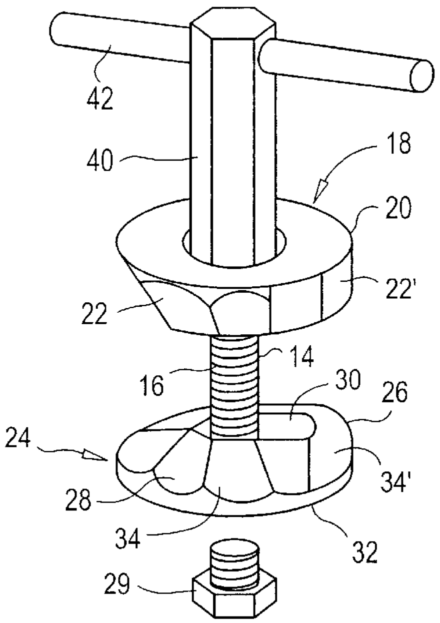
FIG. 2 is a perspective view of the internal components of the FIG. 1 embodiment.

With reference to the side elevational view in FIG. 1 and the perspective view of the internal components in FIG. 2, the piston pulling apparatus 10 of this invention primarily comprises an expandable mandrel 12 mounted around a shaft 14, a portion of which is threaded, as at 16. Secured near the top of the shaft 14 is a head member 18, having a generally circular periphery 20 and a plurality of facets 22, such as eight. The facets can be inclined, as shown in the left sides of FIGS. 1, 2 and 6, or they can be vertical, as shown, at the right sides of FIGS. 1, 2 and 6. The head member 18 can be fixed to the shaft, whereby rotation of the shaft will not cause the head member to be threaded up or down the shaft. Or, the head member can be mounted to rotate around the shaft, but at a non-threaded portion; so that relative rotation between the shaft 14 and the head member 18 will not cause the head member to move up or down the shaft.

A base member 24, also having a generally circular periphery 26 and the same number of facets 28 as the head member 18, is mounted around the threaded portion 16 of the shaft 14. A nut 29 is mounted on the shaft 14, below the base member 14; whereby, rotation of the shaft will cause the nut 29 to move up or down along the shaft, depending upon the direction of shaft rotation, and push the base member upward, as shown in FIG. 6, or let it slide downward to a bottom position, as shown in FIG. 6, or the alternative, as shown in FIG. 7, the base member 24 can be threaded, so as to move up or down the shaft threads 16, without need of the nut 29. The facets 28, as shown in the lower left of FIGS. 1 and 2, are inclined inwardly, so that the upper surface 30 of the base member has a smaller diameter than the bottom surface 32 of the base member. The inclined surface or face 34 of each facet 28 defines a ramp, wedge or camming surface, the function of which is discussed further below. Alternately, as shown in the lower right of FIGS. 1 and 2, the facets 34' can be vertical.

As shown in FIGS. 6 and 7, the bottom of the shaft 14 is formed with a stop element 36, which will prevent the nut 29 or the threaded base member 24 from being threaded off from the bottom of the shaft and thus prevents the base member 24 front falling off the shaft 14. At the top of the shaft 14 there is a projecting portion 40, for receiving a handgrip 42. Or, as shown in the broken away area of FIG. 1 at the top of the shaft 14, there can be a socket 38, over which a mating shaft 40 can be removably mounted. The handgrip 42 can be of any suitable configuration. If there is insufficient vertical space for the shaft, the handle 40 and the users hand, a wrench (not shown) can be applied to the socket 38, at right angle to the axis of the shaft, for rotation of the shaft.

Figure 3A:
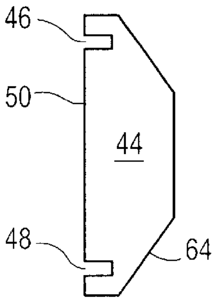
FIGS. 3*a*, 3*b* and 3*c* are side views of three versions of one of the gripping segments.

As shown in FIG. 1, a plurality of gripping segments 44, equal to the number of facets 22, 34, are arranged around the periphery of the head and base members 18 and 24. The segments 44 can be held in relative position by more than one suitable manner. FIGS. 1 and 3*a* show notches 46, 48 in the exterior side 50 of each segment, near its top and bottom, respectively. A pair of bands 52, 54 seat into the notches 46, 48, respectively, like O-rings, to hold the segments 44 against the generally circular peripheries 20 and 26 of the head and base members 18 and 24. The upper band 52 is of constant size; however, the lower band 54 is elastic, to permit the adjacent portions of the array of the segments of the mandrel 12 to be forced radially inward or outward, to have an effective diameter and circumference less than or greater than that at the upper band 52. The lower band can be a tightly wound coil spring.

Figure 8:
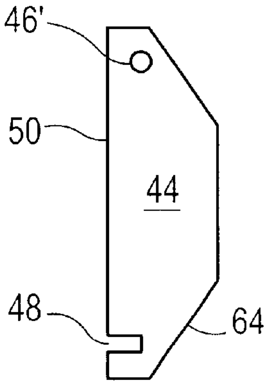
FIG. 8 is a side view of a preferred embodiment of one of the gripping segments.

A preferred embodiment of the gripping segments 44 is shown in FIG. 8 and is different from that shown in FIG. 3*a* in that the notch 46 is replaced by a hole 46'. The top, inelastic band 52 passes through each hole 46' of the gripping segments which thereby cannot fall away from the head member 18, when the apparatus 10 is in the non-expanded condition. When initially fabricating the piston puller 10 of this preferred embodiment, the band 52 can be of a length of metal, which is threaded through the holes 46' and welded at its ends to form a ring. Such band 52 need not be round in cross section.

Figure 3B:
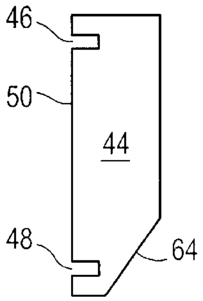
Figure 3C:
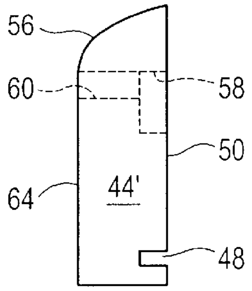
Figure 5:
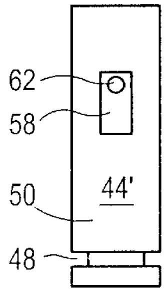
FIG. 5 is a front view of the segment shown in FIG. 3*c;*
Figure 4:
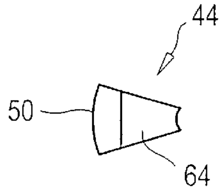
FIG. 4 is a bottom view of the segment shown in FIG. 3*a;*

As shown in FIGS. 3*c* and 5, the gripping segment 44' has a curved interior side 56 near its top and a notch 58, which is vertically elongated and extends into a passageway 60, through which a pivot pin 62 can pass and seat into the facet 22 of the head member 18. Thereupon, the bottom end of the segment 44' can pivot radially outward around the pivot pin 62, to achieve the same increase in diameter and circumference of the mandrel 12 as the same portion of the segment 44 of FIGS. 3*a* and 3*b*, adjacent the elastic band 54.

To force the bottom of the segments 44 and 44' radially outward, as shown in FIGS. 6 and 7, from a generally vertical orientation, as shown in FIG. 1, the shaft 14 is rotated clockwise to cause the nut 29 in FIG. 6 to thread upward and push the base member 24 upward; or, the threaded base member in FIG. 7 to thread up. This causes its inclined facet faces 34, 34' to move upward against the interior surfaces 64, 64' of the segments 44, 44' to force those surfaces radially outward. The face 34 need not be inclined, as shown in the lower left of FIG. 1 and in FIG. 2. The facet face can be vertical, as shown in the lower right of FIGS. 1 and 2, as element 34'.If both the facet face 34 and the interior lower surface 64 are inclined or sloped similarly, the radial expansion of the gripping segments is more smoothly, incrementally achieved than if only one of these pairs of surfaces (34, 64'; or 34', 64) is inclined, or none are inclined.

As shown in FIGS. 6 and 7, the gripping segments 44 (or 44'), of which two of many are illustrated, are splayed to form an outward surface, like the surface of a cone, with the bottom portions of the segments firmly backed by the faces 34 (or 34') of the facets 28 of base member 24. The bottoms of the segments are held in this new position by the elastic band 54. The top ends of the segments are held in place by the top band 52, against the periphery 20 of the head member 18. If, as shown in FIG. 7, the interior side 66 of the combustion bowl 68 of the piston 69 is sloping so that the lip 70 of the bowl has a smaller diameter than the bottom 72 of the bowl, then the splayed gripping segments 44 can be forced tightly into being somewhat parallel with the interior 66 of the bowl. A condition which would be most effective to hold the piston pulling apparatus 10 firmly in place while it is pulled upward relative to the cylinder liner 74 and cylinder 76, to disengage the piston 69 therefrom.

Figure 9:
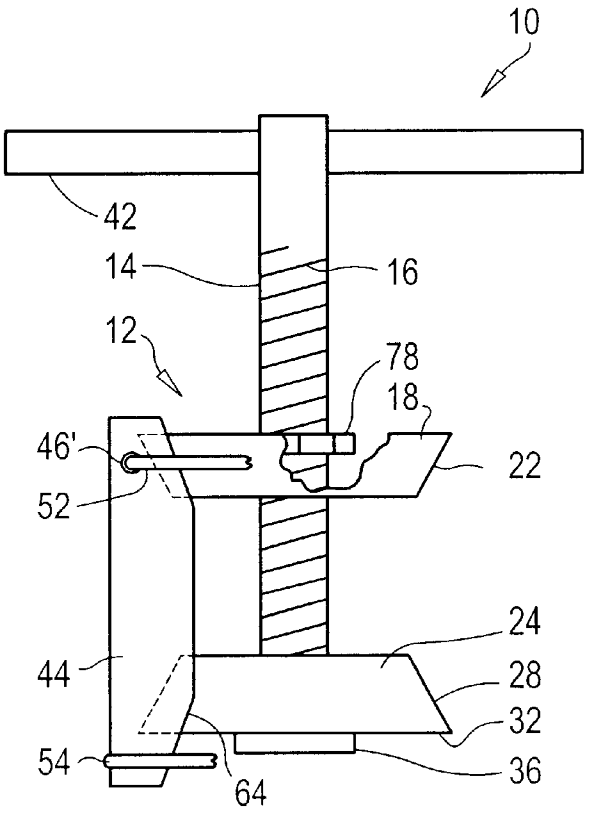
FIG. 9 is a view, similar to FIG. 1, of a preferred embodiment of the invention.

The embodiments shown in FIGS. 1, 2, 6 and 7 have a limitation best understood by a comparison of FIGS. 6 and 7. As now should be understood, to cause the base member 24 to rise and thereby cam against the interior surface 64 of the gripping segments 44, the threaded shaft 14 will be advanced downward into the piston bowl 68. If the diameter of the piston bowl 68 was significantly greater than shown in FIG. 7, then the stop element 36 on the bottom of the shaft 14 would hit the bottom 72 of the bowl, before the base member 24 could be raised sufficiently to force the exterior sides 50 of the gripping segments 44 firmly against the interior side 66 of the bowl. The preferred embodiment of FIG. 9 avoids such a problem. As shown in FIG. 9, seated in the head member 18 is a nut 78, which is threaded on the threads 16 of the shaft 14. When the expansion mandrel 12 of the tool 10 is in its relaxed, non-expanded orientation, as shown in FIG. 9, the lower end of the shaft 14 at its stop element 36 is close to the bottom surface 32 of the base member 24 and would be safely above the surface 72 (not shown) of the bowl 68. Thereupon, threading the shaft counterclockwise (assuming conventional thread) will cause the shaft 14 to move upward. Since the nut 78 is seated in the head member 18, which itself cannot move vertically, the only relative vertical movement can be the upward movement of the entire shaft 14, with its bottom located stop element 36. Hence, the stop element 36 also will move upward and raise the base member 24 upward and force its facets 34 against the surfaces 64 of the segments 44; to thereby expand the lower end of the mandrel 12 against the interior side 66 of the piston bowl 68; whereupon, the apparatus 10 can be pulled axially upward and carry with it the piston bowl 68 and its piston 69.

If the interior side 66 of the combustion bowl is more perpendicular, it would be better if the gripping segments were more parallel to each other in the expanded/gripping orientation, than as shown in FIG. 7. This can be accomplished if the head and base members 13 and 24 are further apart (hence the segments 44 are longer) and/or their diameters and circumferences more closely approach that of the interior of the combustion bowl, so that radial expansion by the mandrel 12 is relatively small.

If the interior 66 of the compression bowl 68 has a larger base diameter 72 than its lip 70, the head member 18 can have a diameter larger than that of the base member 24, so that the exterior sides 50 of the gripping segments 44 are inclined slightly v-shaped as they expand outwardly against the generally mating surface 66 of the bowl. This would be a reverse orientation that that shown in FIGS. 6 and 7. Yet also, if the interior side 66 of the bowl 68 was of some unique shape (not shown in FIG. 7) then the surface 50 of the segments 44, proximate the notches 43 and the bottom band 54, could be formed to have similar, unique shape (also not shown in the Figs.)

To achieve a firm, splayed orientation, as shown in FIGS. 6 and 7, a piston having a five inch (12.70 cm.) combustion bowl maximum interior diameter, as shown in FIG. 7, can be pulled safely and effectively by the apparatus according to this invention, when the mandrel 12 is expanded by about one inch (2.54 cm.) in diameter. Such a piston puller 10 would have gripping segments about four inches long (10 cm.). Hence, a relatively small, easily portable, very efficient piston pulling apparatus can be made according to this invention. To accommodate a large range of piston diameters, and combustion bowl profiles, at least a few different of this novel piston puller apparatus, or interchangeable parts, could be needed. Such differences and other possibly needed variables would be well within the skill in the art, in view of the teachings of the present patent specification and its Figures, without departing from the scope of the invention, as defined by the appended claims.

What I claim is:

1. A piston pulling apparatus comprising:

a body having a head member and a base member;

said body, between said head and base members, initially having a cylindric periphery defined by the exterior surfaces of an array of gripping segments, each said gripping segment having a top, an exterior surface, an interior surface and a bottom;

said segment tops being secured to each other by inelastic means proximate said head member;

said segment bottoms being secured to each other by elastic means and initially arranged around said base member;

said base member is mounted for controlled movement toward said head member and for impinging upon each said interior surface during such movement;

said base member and each said interior surface being constructed and arranged such that impinging movement of said base member displaces said segment bottoms radially outward, to increase the circumference of said apparatus proximate to said segment bottoms, but said inelastic means holds said segments tops to prevent their radial displacement; and said head member is mounted to inhibit its movement toward as well as away from said base member.

2. A piston pulling apparatus according to claim 1 in which, said base member has a generally circular periphery.

3. A piston pulling apparatus according to claim 1 in which, each of said yipping segments has a curved exterior surface, which forms a portion of said cylindric periphery.

4. A piston pulling apparatus according to claim 3 in which, said increase of the circumference is at least sufficient to equal the interior circumference of a piston bowl, into which each said segment bottom is positioned, for said curved exterior surface to be forced against.

5. A piston pulling apparatus according to claim 1 in which, each said interior surface defines a sloped camming surface upon which paid base member slides during said impinging.

6. A piston pulling apparatus according to claim 5 in which, said base member contains a plurality of sloping facets, equal in number to said sloped camming surfaces of said array of gripping segments; and each said sloped camming surface is positioned to slide upon a respective one of said sloping facets.

7. A piston hulling apparatus according to claim 1 in which, means for imparting controlled movement of said base member is coupled to said base member.

8. A piston pulling apparatus according to claim 7 in which, said movement imparting means includes a threaded shaft coaxial with said gripping segments.

9. A piston pulling apparatus according to claim 8 in which said movement imparting means further includes:

a nut threaded on said shaft and positioned beneath said base member; and said base member surrounds said shaft loosely, not being threaded thereon;

rotation of said shaft causing said nut to move upward toward said head member and push upward said base member.

10. A piston pulling apparatus according to claim 8 in which, said base member is threaded upon said shaft; whereby rotation of said shaft causes said base member to move upward toward said head member.

11. A piston pulling apparatus according to claim 8 in which said movement imparting means further includes:

said head member being coupled to said shaft, such that rotation of said shaft in one direction causes said shaft to move upward relative to said head member; and said shaft extends through and below said base member; whereby upward movement of said shaft causes upward movement of said base member, to which it is coupled.

12. A piston pulling apparatus according to claim 8 further including:

a handle coupled to said shaft at a location above said head member.

* * * * *